US008227078B2

(12) United States Patent
Morra et al.

(10) Patent No.: US 8,227,078 B2
(45) Date of Patent: Jul. 24, 2012

(54) ANTI-FOULING COATINGS FOR COMBUSTION SYSTEM COMPONENTS EXPOSED TO SLAG, ASH AND/OR CHAR

(75) Inventors: Martin Mathew Morra, Glenville, NY (US); Aaron John Avagliano, Houston, TX (US); Wei Chen, Sugar Land, TX (US); Kristopher John Frutschy, Clifton Park, NY (US); Monty L. Harned, Sugar Land, TX (US); Shashishekara S. Talya, Houston, TX (US); James Michael Storey, Houston, TX (US)

(73) Assignee: General Electric Company, Niskayuna, NY (US)

( * ) Notice: Subject to any disclaimer, the term of this patent is extended or adjusted under 35 U.S.C. 154(b) by 1200 days.

(21) Appl. No.: 12/028,873

(22) Filed: Feb. 11, 2008

(65) Prior Publication Data

US 2009/0202717 A1    Aug. 13, 2009

(51) Int. Cl.
*B32B 9/00* (2006.01)
(52) U.S. Cl. ......... 428/328; 428/426; 428/701; 428/702
(58) Field of Classification Search ............ None
See application file for complete search history.

(56) References Cited

U.S. PATENT DOCUMENTS 3,307,616 A * 3/1967 Giger ..................... 165/134.1
4,234,653 A   11/1980 Ballard et al.
5,985,454 A * 11/1999 McMordie et al. ........... 428/413
6,372,299 B1   4/2002 Thompson et al.
2002/0155316 A1 10/2002 Zheng
2006/0204666 A1 * 9/2006 Buczek et al. ............. 427/421.1
2006/0269759 A1 * 11/2006 Bayer et al. ................. 428/426
2007/0141369 A1 * 6/2007 Hazel et al. ................. 428/469
2007/0186473 A1   8/2007 Wallace

FOREIGN PATENT DOCUMENTS

| EP | 0013906 | 8/1980 |
| GB | 1220331 | 1/1971 |
| JP | 04099884 | 3/1992 |

OTHER PUBLICATIONS

R. Kurz and K. Brun, "Degradation in Gas Turbine Systems", Aug. 2000, American Soc. Mechanical Engineers, Paper No. 2000-GT-345, pp. 1-9.*
PCT/US2009/030101 PCT International Search Report, Jul. 14, 2009.
JP04099884 Abstract, Mar. 31, 1992.
PCT/US2009/030101 Notice of Transmittal of the International Search Report and Written Opinion, Jul. 14, 2009.

* cited by examiner

*Primary Examiner* — Timothy Speer
(74) *Attorney, Agent, or Firm* — Ann M. Agosti

(57) ABSTRACT

A coating for use in combustion systems includes a plurality of refractory metal particles in a ceramic, glass or metal matrix disposed on surfaces of the system that are prone to slag, ash, and/or char buildup during operation of the combustion system. The coating is effective to prevent any substantial interaction with the slag, ash, and/or char.

10 Claims, 4 Drawing Sheets

ANTI-FOULING COATINGS FOR COMBUSTION SYSTEM COMPONENTS EXPOSED TO SLAG, ASH AND/OR CHAR

BACKGROUND

The present disclosure generally relates to anti-fouling coatings for use on components employed in combustion systems and exposed to slag, ash, and/or char.

Combustion systems, such as gasifiers and pulverized coal fired plants, are often used to convert carbon based feedstocks to synthetic gas, called "syngas." Gasification can use a wide range of fuels including coal, petroleum coke, biomass, oil refinery bottoms (waste oil), digester sludge, and virtually anything that contains carbon and can be fed into a gasification chamber. The high temperature (generally at about 1150 to about 1,700° C.) melts the inert material and then flows to the bottom of the gasification vessel where it is cooled into a glass-like non-leachable inert slag. This slag is used primarily as aggregate in road gravel or concrete applications.

In an integrated gasification combined cycle (IGCC) facility, an air separation unit separates air into its component parts and sends the gasifier a stream of pure oxygen. The gasifier then produces the syngas from a variety of fuels. For example, coal slurry is injected with oxygen at high pressure as it is fed through injection nozzles into the gasification chamber where it can then be converted into syngas. Byproducts of the gasification process include slag, ash, and char, among others. Syngas is then cooled using either radiation or convective heat exchangers for heat recovery for energy generation and to cool the gas before it is piped through environmental control processes where pollutants and particulates are easily removed and this is called the "gas clean-up" phase of gasification. For example, the raw syngas can pass through a series of coolers to reduce the temperature and produce high-pressure steam. The recovered heat can be used to preheat clean syngas and boiler feed water. Afterwards, syngas can be cleanly burned in a combined cycle gas turbine. Combined cycle technology is composed of gas turbines, steam turbines, and their supporting infrastructure.

One of the problems in current combustion systems such as the IGCC system discussed above or in gas turbines for either aviation or land based (CMOS) is the build up of slag, ash, and/or char on internal surfaces i.e., surface fouling. As used herein, ash generally refers to the remnants of completely combusted particles of the fuel. The ash particles in the hot gas stream have not reached the melting temperature of the mineral matter originally contained in the fuel. These ash particles are typically less than 74 microns in size. The composition of the ash produced from a metals containing liquid hydrocarbonaceous fuel substantially generally includes a metal selected from the group consisting of Fe, Zn, Ni, V, Na, and mixtures thereof, and the metal sulfides and possibly oxides thereof. The term slag refers to substantially molten ash or molten ash that has solidified into glassy particles. Slag particles are remnants of completely burnt fuel particles or slurry droplets and represent the fused mineral (sand, rocks, etc.) matter of the fuel feed. The content of mineral matter, e.g. ash in a typical solid carbonaceous fuel in weight percent may be about 0.2 for petroleum coke and 20.0 for coal. Char is the de-volatilized and partially combusted solid carbonaceous fuel particles consisting mainly of ash. The remainder of the char e.g. about 2-65 wt. % comprises carbon, and little, if any, hydrogen and/or sulfur. The particles have not reached the melting temperature of the mineral matter originally contained in the solid carbonaceous fuel.

Typically, the buildup of slag, ash, and/or char on various surfaces is mechanically removed when the respective combustion system is taken out of service. In some instances, this requires an operator to physically hammer the slag from the walls. There are currently no physical barrier coatings that are designed to prevent ash deposition onto and slag reaction with surfaces in contact therewith at the high combustion temperatures found in gasification plants or potentially other combustion systems. The push to use ceramics for higher operating temperatures in fossil fuel combustion systems is dramatically limited by the reducing atmosphere present within and the deposition and chemical attack by slag byproducts contained in the combustions gases.

Accordingly, there remains a need for a barrier coating that resists chemical attack by molten slag, prevents buildup of slag and ash, and can withstand the harsh environment of combustion systems.

BRIEF SUMMARY

Disclosed herein are combustions systems, anti-fouling coatings for various components used in combustion systems, and processes for preventing slag, ash, and/or char buildup on components used in combustion systems. In one embodiment, a combustion system comprises a coating of pure or alloyed refractory metal particles in a metal, ceramic or glass matrix disposed on a surface of the system that is prone to slag, ash, and/or char buildup during operation of the combustion system, wherein the coating is effective to prevent any substantial interaction with the slag, ash, and/or char.

A process for preventing slag, ash, and/or char buildup on a surface, the process comprises alloying, during deposition, a coating of refractory metal particles in a ceramic, glass or metal matrix on a surface that is prone to slag corrosion, slag buildup, ash buildup, and/or char buildup during operation of a combustion system.

An anti-fouling coating for combustion system components exposed to slag, ash, and/or char comprises a plurality of nano-sized pure and/or alloyed refractory metal particles, wherein the nano-sized particles are essentially spheres; a plurality of micro-sized pure and/or alloyed refractory metal particles, wherein the micro-sized particles are essentially spheres; and a matrix comprising a glass, ceramic or metal, wherein the pluralities of nano-sized and micro-sized pure and/or alloyed refractory metal particles are disposed within the matrix.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
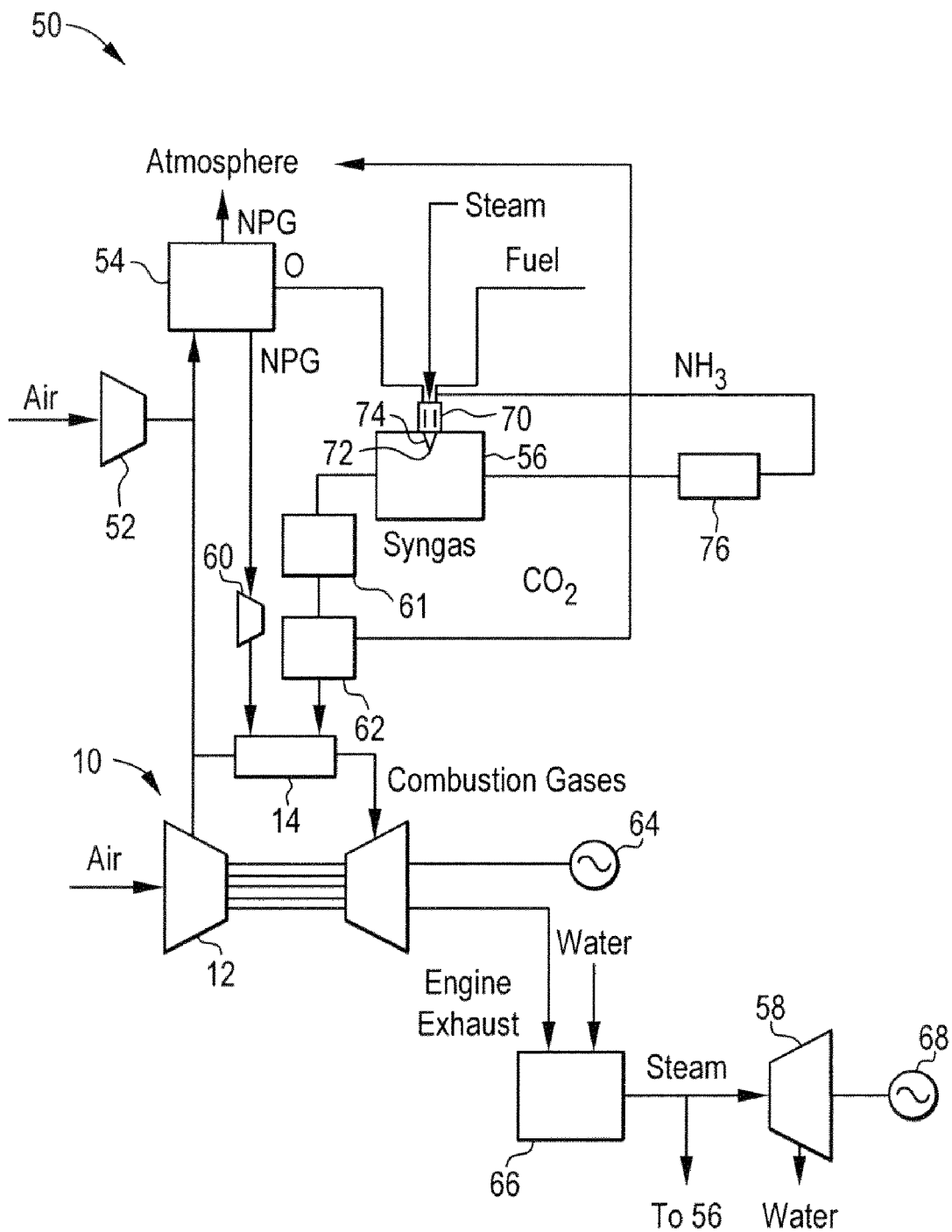
FIG. 1 is a schematic diagram of an exemplary combustion system known integrated gasification combined-cycle (IGCC) power generation system.

The gasification of carbonaceous materials presents a high temperature, high-pressure environment with corrosive and erosive gaseous streams flowing in the process piping and equipment. By high temperatures, it is generally meant at temperatures greater than 500° F. and by high pressure, it is generally meant at pressures greater than 50 pounds per square inch gauge (psig). Deposits of slag, ash, and char are byproducts of the gasification process and can deleteriously coat or in the case of slag react with internal surfaces. When such deposits break off and are suspended or entrained with the other entrained solids, severe plugging problems are presented. Moreover, for combustion systems that include a heat exchanger, heat transfer can be affected by the buildup. Disclosed herein is an anti-fouling coating that can be applied to those internal surfaces prone to buildup of slag, ash, char, and the like. The coating can be applied to metal and/or ceramic surfaces that form the materials used to form the various combustion system components employed in the high temperature, high-pressure environments. For example, the anti-fouling coating can suitably be used for coating various surfaces of coal gasifiers, the injector nozzle for introducing the coal slurries into the gasification chamber, posimetric pump transition components, the convective syngas cooler components, syngas quenching systems that include quench ring and dip tube assemblies that can become exposed to molten slag when the throat bricks wear-out and like components, linings of the heat exchanger surfaces in radiant syngas coolers, and like components that require anti-stick (anti-fouling) behavior.

The anti-fouling coating is a thermally and electrically conductive coating comprised of pure refractory metal particles or particles that have been alloyed with the substrate material during deposition that are embedded in a glass, ceramic, or metal matrix. In one embodiment, the pure and/or alloyed refractory metal particles are in the form of spheres or spheroids. In this embodiment, the spheres are substantially uniform and high-density nano- and/or micron-scale size. The anti-fouling coating has been found to reduce adhesion of slag-type or ash-type deposits. This coating can be used on materials found in high temperature reducing atmospheres such as those found in gasifiers, pulverized coal plants, or any combustion application that require an anti-stick coating to prevent fouling of components, gas pathways, moving surfaces, and the like.

Suitable refractory metals include molybdenum, tantalum, tungsten, vanadium, rhenium, osmium, iridium, niobium, ruthenium, hafnium, zirconium, and combinations thereof and alloys of the refractory metals with base metal elements selected from the group consisting of nickel, iron, chromium, colbalt, silicon, aluminum, and titanium.

As discussed above, the matrix can be a ceramic, metal or glass material. The matrix is not intended to be limited to any particular type and can be any material suitably used at the temperatures and environment for the particular combustion system; its function being to act as a carrier and bonding agent for the pure or alloyed refractory metal particles. It has been found that the glass, ceramic or metallic phase shields the refractory metal from sublimation (refractory metal oxide sublimation) in oxygen containing atmospheres such as those that exist on startup of coal gasification systems or other combustion systems. Moreover, once under the reducing conditions that exist in combustion the refractory metal particles cannot form stable oxides and will not form a physical (adhesion) or chemical bond with the ash or slag present in the combustion gases. As such, a coated surface having the refractory metal particles prevents the slag, ash and/or char particles from sticking to the surface.

The coating can be applied by any means that produces a coating containing the refractory metal particles in glass, ceramic, or metallic matrices. For example, the coating can be applied by electro-spark or electro-arc deposition or by any coating technique that produces a coating containing the refractory metal particles in glass, ceramic, or metallic matrices. In one embodiment, the coating process will alloy the constituents of the substrate material to form a solid solution metallic bond.

Electrospark generally refers to a micro-welding process that uses a short duration electrical pulse to melt and deposit a portion of a consumable metallic electrode onto a base material. The deposited material alloys with the base material to form a metallurgical bond. The short duration of the electrical pulse allows for the extremely rapid solidification of the deposited material and results in a fine-grained homogeneous weld deposit.

In the electrospark alloying process, the electrode and the work piece are conductive and form the terminal points of a direct current power source. When a surge of energy is applied to the electrode, a spark is generated between the electrode and the work piece. A portion of the metal electrode is melted due to the high temperature of the spark, which is then transferred from the electrode to the substrate surface by short circuit transfer. Electrospark deposition may be utilized on nearly any metallic or cermet electrode/substrate combination, provided both the electrode and the substrate are electrically conductive and have a melting point.

In an electric arc coating process, two electrically charged wires are brought together creating an arc. The temperature at the arc melts the wires and atomizing gas propels the molten particles at the substrate to be coated at low velocity.

Thickness of the coating will vary dependent on the applications and the capability of the coating process. In extremely harsh conditions, the coating can be expected to be ablative and hence may need to be thicker.

Using an IGCC as an example, the coating can be applied to numerous surfaces prone to slag, ash, and char buildup. FIG. 1 is a schematic diagram of an exemplary combustion system that would benefit from having some of the surfaces coated with the coating as described above. The exemplary combustion system is an IGCC power generation system 50 and is not intended to be limiting with regard to the type and configuration of combustion system to which the coatings as described herein are advantageously used to prevent slag corrosion as well as slag, ash, and char buildup. The coatings are suitable for any combustion system where slag corrosion and slag, ash, and char buildup are issues. The exemplary IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. The gasifier interior walls are typically formed of a ceramic material.

In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas". The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 52 is then passed through heat exchanger 61, which may be of a radiant or convective design and is used to cool the syngas that exits the gasifiers. The cooled syngas may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 52 for generating the syngas.

In the exemplary IGCC, gasifier 56 includes an injection nozzle 70 extending through gasifier 56. Injection nozzle 70 includes a nozzle tip 72 at a distal end 74 of injection nozzle 70. In the exemplary embodiment, injection nozzle 70 is configured to direct a stream of ammonia proximate nozzle tip 72 such that the stream of ammonia facilitates reducing a temperature of at least a portion of nozzle tip 72.

In the exemplary embodiment, IGCC system 50 includes a syngas condensate stripper 76 configured to receive condensate from a stream of syngas discharged from gasifier 56.

Advantageously, the coatings can be used to substantially reduce and/or prevent build up of slag and/or ash particles. For example, the coating can be applied to internal surfaces of the gasifier 56; the injection nozzles 70 utilized to deliver the fuel and/or oxygen into the gasifier; the heat exchanger surfaces 61 in large heat exchangers into which the hot (1600° C.) syngas passes after exiting the gasifier that are used for heat recovery and to cool the syngas before it can be cleaned, and the like. Advantages of the coating for heat exchanger surfaces is primarily anti-fouling; and for the nozzle applications, the coating primarily reduces and/or prevents slag corrosion or sticking. As a result, chemical attack by molten slag, glasses, ceramics ashes and the like will be prevented, heat transfer through metallic heat exchangers surfaces will be increased, and plugging of orifices or channels will be prevented. The business benefits are numerous; life extension for components in combustion atmospheres, anti-stick or anti-fouling coatings in ash containing combustion gases, non reactive coatings for use on components exposed to molten slag, increase efficiency for heat exchanger surfaces in combustion gas streams, and the like.

The following examples are presented for illustrative purposes only, and are not intended to limit the scope of the invention.

Example 1

Figure 2:
FIG. 2 pictorially illustrates the beading of melted slag disposed on a coating of refractory metal particles in a silicate matrix which had been disposed on a substrate.
Figure 3:
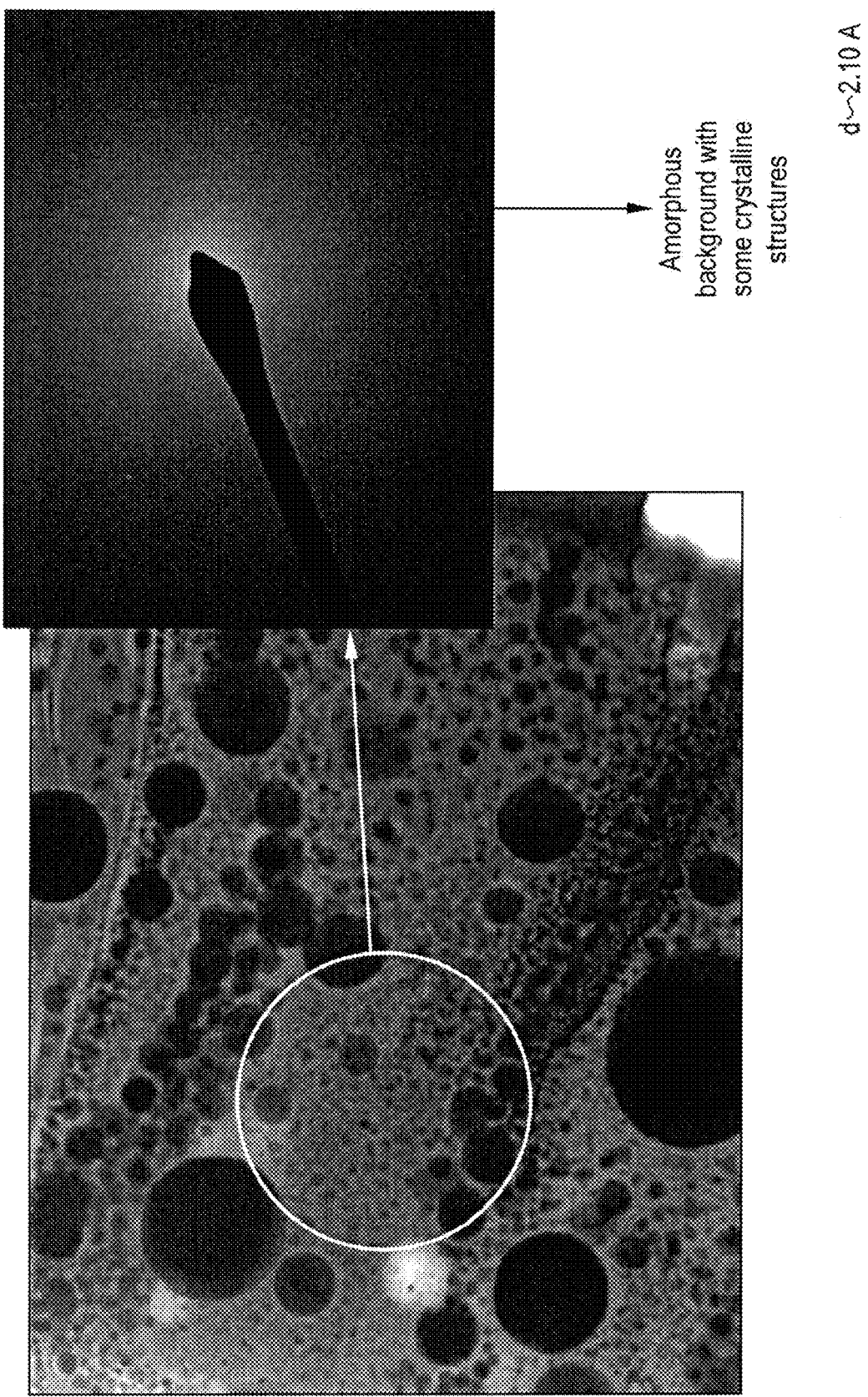
FIG. 3 illustrates scanning electron micrograph of a coating of refractory metal particles in a silicate matrix.

In this example, an electrospark process was utilized to deposit a coating onto a substrate. A slag piece was positioned onto the coated substrate and subsequently heated to melting using a gas burner. FIG. 2 pictorially illustrates the slag piece "beading" up on an electric arc coating, which exhibited no reaction with the coating. It should be noted that in the absence of the coating, the slag upon melting would wet the surface of the substrate. FIG. 3 pictorially illustrates a sectional view of the refractory metal/silicate coating. As shown, the coating exhibited uniform nano- and microspheres of refractory metal embedded within a silicate matrix. Examination of the silicate matrix illustrated this to be amorphous with some crystalline structures.

Example 2

Figure 4:
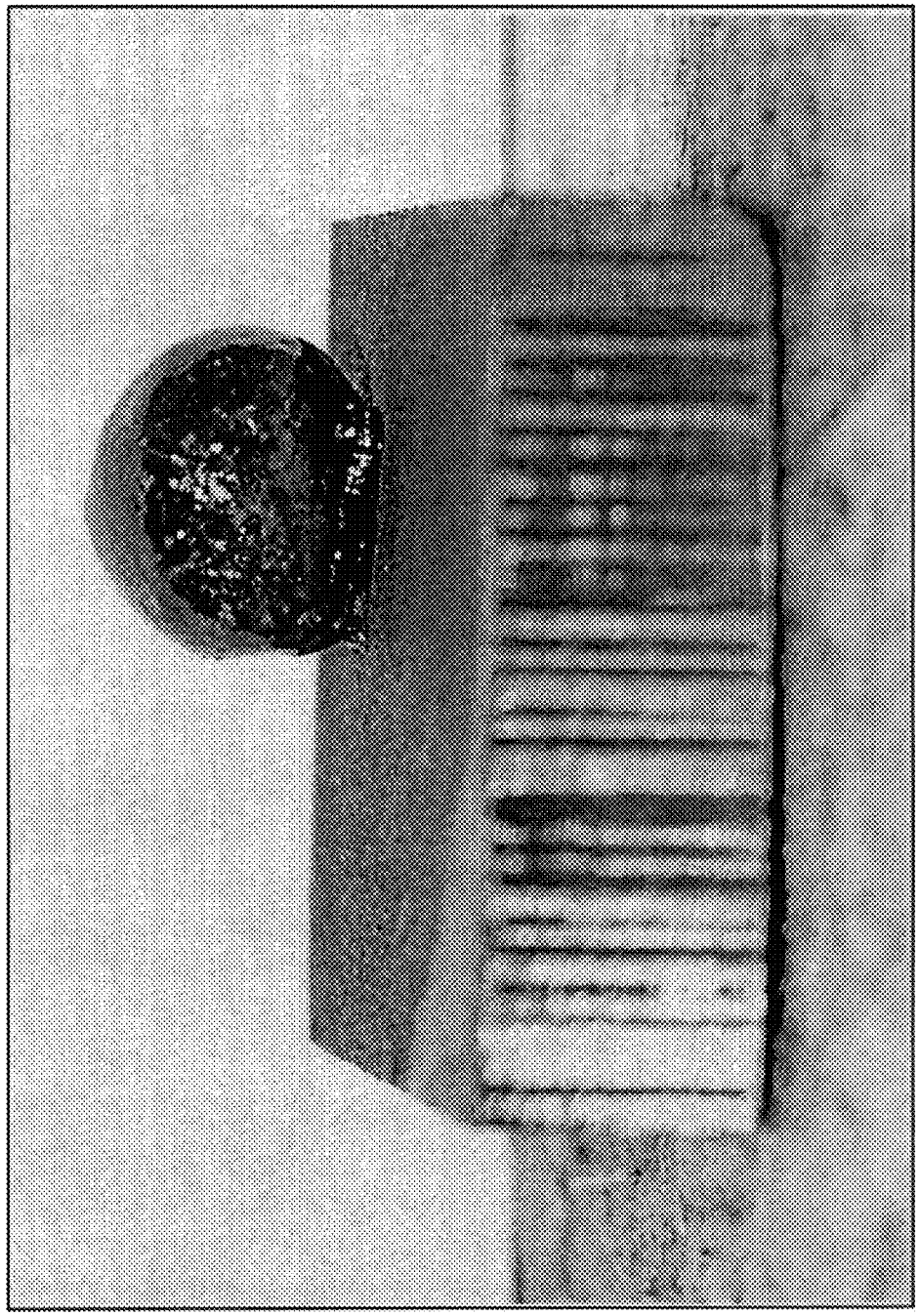
FIG. 4 pictorially illustrates the beading of melted slag disposed on a coating of refractory metal particles in a silicate matrix, which had been disposed on a metal coupon.

In this example, an electrospark process was utilized to deposit a coating onto a metal coupon. A slag piece was positioned onto the coated substrate and subsequently heated using a gas burner as in Example 1. FIG. 4 pictorially illustrates a refractory metal/silicate coating that had been deposited onto a metal coupon. Again, the slag appears to have been repelled by the surface and formed a droplet that exhibited no interaction with the coated surface. In this example the substrate could be a machined component onto which the coating has been applied.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An anti-fouling coating for combustion system components exposed to any one or more of slag, ash, and char, comprising: any one or more of nano-sized pure refractory metal particles and alloyed refractory metal particles, wherein the nano-sized particles are essentially spheres; a plurality of any one or more of micron-sized pure refractory metal particles and micron-sized alloyed refractory metal particles, wherein the micron-sized particles are essentially spheres; and a matrix comprising a glass or ceramic, wherein anyone or more of the nano-sized and micron-sized pure refractory metal particles and the nano-sized and micron sized alloyed refractory metal particles are disposed within the matrix.

2. The anti-fouling coating of claim 1, wherein the refractory metal is selected from the group consisting of molybdenum, tantalum, tungsten, vanadium, rhenium, osmium, iridium, niobium, ruthenium, hafnium, zirconium, and combinations thereof and alloys of the refractory metals with base metal elements selected from the group consisting of nickel, iron, chromium, cobalt, silicon, aluminum, and titanium.

3. The anti-fouling coating of claim 1, wherein the refractory metal particles comprise essentially spherical shapes.

4. A combustion system, comprising at least one component for combusting fuel material wherein the component is exposed to combusted fuel material that produces any of slag, ash or char during operation of the combustion system,
the component having a coating disposed on a surface of the component wherein the coating comprises any one or more of pure refractory metal particles and base-metal alloyed refractory metal particles in a ceramic matrix or glass matrix and
wherein the coating is effective to prevent formation or buildup of any one or more of slag, ash, or char thereon.

5. The combustion system of claim 4, wherein the refractory metal particles comprise essentially spherical shapes.

6. The combustion system of claim 4, wherein the refractory metal is selected from the group consisting of molybdenum, tantalum, tungsten, vanadium, rhenium, osmium, iridium, niobium, ruthenium, hafnium, zirconium, and combinations thereof and alloys of the refractory metals with base metal elements are selected from the group consisting of nickel, iron, chromium, cobalt, silicon, aluminum, and titanium.

7. The combustion system of claim 4, wherein the refractory metal particles comprise nano sized particles and micron sized particles.

8. The combustion system of claim 4, wherein the component is a gasification chamber and the surface defines at least a portion of the gasification chamber.

9. The combustion system of claim 4, wherein the component is an injection nozzle and the surface defines at least a portion of the injection nozzle wherein the injection nozzle is configured for injecting fuel into the gasification chamber.

10. The combustion system of claim 4, wherein the component is 1) a heat exchanger or 2) a component wherein the surface is in a flow path of combustion products.

* * * * *

UNITED STATES PATENT AND TRADEMARK OFFICE
CERTIFICATE OF CORRECTION

| | | |
|---|---|---|
| PATENT NO. | : 8,227,078 B2 | |
| APPLICATION NO. | : 12/028873 | |
| DATED | : July 24, 2012 | |
| INVENTOR(S) | : Morra et al. | |

It is certified that error appears in the above-identified patent and that said Letters Patent is hereby corrected as shown below:

In Column 3, Line 48, delete "colbalt" and insert -- cobalt --, therefor.

In Column 6, Line 56, in Claim 1, delete "anyone" and insert -- any one --, therefor.

Signed and Sealed this
Sixteenth Day of October, 2012

David J. Kappos
*Director of the United States Patent and Trademark Office*